United States Patent
Parrinello et al.

(10) Patent No.: US 11,878,448 B2
(45) Date of Patent: *Jan. 23, 2024

(54) METHOD AND AN APPARATUS FOR COMPRESSION MOULDING AN OBJECT MADE OF POLYMERIC MATERIAL

(71) Applicant: SACMI COOPERATIVA MECCANICI IMOLA SOCIETA' COOPERATIVA, Imola (IT)

(72) Inventors: Fiorenzo Parrinello, Medicina (IT); Fabrizio Pucci, Castel Guelfo di Bologna (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/643,021

(22) Filed: Dec. 7, 2021

(65) Prior Publication Data

US 2022/0097263 A1     Mar. 31, 2022

Related U.S. Application Data (63) Continuation of application No. 15/566,956, filed as application No. PCT/IB2016/052541 on May 4, 2016, now Pat. No. 11,224,999.

(30) Foreign Application Priority Data

May 5, 2015    (IT) ........................ 102015902349512

(51) Int. Cl.
    *B29C 43/34*      (2006.01)
    *B29C 43/52*      (2006.01)
                (Continued)

(52) U.S. Cl.
    CPC .............. *B29C 43/34* (2013.01); *B29C 43/52* (2013.01); *B29C 2043/3433* (2013.01);
                (Continued)

(58) Field of Classification Search
    CPC . B29C 2043/5833; B29C 51/38; B29C 43/34; B29C 43/085; B29C 2043/5816;
                (Continued)

(56) References Cited

U.S. PATENT DOCUMENTS

| | | |
|---|---|---|
| 4,303,382 A | 12/1981 | Gellert |
| 4,874,571 A | 10/1989 | Muller |

(Continued)

FOREIGN PATENT DOCUMENTS

| | | |
|---|---|---|
| CN | 1406174 A | 3/2003 |
| CN | 1575950 A | 2/2005 |

(Continued)

OTHER PUBLICATIONS

Roozemond et al, Modeling flow-induced crystallization in isotactic polypropylene at high shear rates, Jan. 1, 2015 Eindhoven University of Technology, pp. 614-642. (Year: 2015).*

(Continued)

*Primary Examiner* — Francisco W Tschen
*Assistant Examiner* — Elisa H Vera
(74) *Attorney, Agent, or Firm* — Pearne & Gordon LLP; J. Gregory Chrisman (57) ABSTRACT

A method for producing an object made of a polymeric material, said polymeric material having a melting temperature ($T_F$), comprises the steps of: melting the polymeric material; after the step of melting, cooling the polymeric material below the melting temperature ($T_F$) in a cooling zone; severing a dose from a flow of polymeric material coming from the cooling zone by means of a severing element (5); obtaining said object by shaping the dose (Continued)

between a male forming element and a female forming element (10) which move towards one another with a mutual movement speed, the dose having a temperature lower than said melting temperature ($T_F$). Between a start-of-forming configuration, in which the dose is in contact with both the male forming element and the female forming element (10), and a start-of-deceleration configuration, in which the male forming element and the female forming element (10) begin to decelerate relative to one another, the mutual movement speed is greater than 10 mm/s.

11 Claims, 3 Drawing Sheets

(51) Int. Cl.
    *B29C 43/58*     (2006.01)
    *B29K 101/12*     (2006.01)

(52) U.S. Cl.
    CPC ............... *B29C 2043/5816* (2013.01); *B29C 2043/5833* (2013.01); *B29K 2101/12* (2013.01)

(58) Field of Classification Search
    CPC ............ B29C 2043/3433; B29C 43/52; B29K 2995/004
    See application file for complete search history.

(56) References Cited

U.S. PATENT DOCUMENTS

| | | | |
|---|---|---|---|
| 5,171,557 A | 12/1992 | Crosbie et al. | |
| 5,316,707 A | 5/1994 | Stanciu et al. | |
| 5,575,433 A * | 11/1996 | Kammler | B29C 45/14754 |
| 9,717,355 B2 | 8/2017 | Azuma et al. | |
| 11,224,999 B2 * | 1/2022 | Parrinello | B29C 43/34 |
| 2004/0096539 A1 | 5/2004 | McCaffrey et al. | |
| 2005/0017391 A1 | 1/2005 | Kobayashi et al. | |
| 2008/0057147 A1 | 3/2008 | Bergami et al. | |
| 2009/0008810 A1 * | 1/2009 | Parrinello | B29C 43/36 |
| | | | 264/40.5 |
| 2010/0072660 A1 | 3/2010 | Achille | |
| 2011/0155341 A1 | 6/2011 | Li et al. | |
| 2013/0020740 A1 | 1/2013 | Jenko et al. | |
| 2015/0289691 A1 | 10/2015 | Azuma et al. | |

FOREIGN PATENT DOCUMENTS

| | | | | |
|---|---|---|---|---|
| CN | 102811847 A | 12/2012 | | |
| CN | 103895200 A | 7/2014 | | |
| EP | 1265736 A2 | 12/2002 | | |
| JP | 2003525778 A | 9/2003 | | |
| JP | 2013006321 A | 1/2013 | | |
| JP | 2013082205 A | 5/2013 | | |
| WO | 8704387 A1 | 7/1987 | | |
| WO | 0166327 A2 | 9/2001 | | |
| WO | WO-0166327 A2 * | 9/2001 | ............ | B29C 43/16 |
| WO | 2008118643 A1 | 10/2008 | | |
| WO | 2014080934 A1 | 5/2014 | | |

OTHER PUBLICATIONS

State University Winona; "Compression Moulding (Matched-Die-Molding)", May 12, 1997; XP55366021; pp. 1-13.
Roozemond, et al., "Modeling Flow-Induced Crystallization in Isotactic Polypropylene at High Shear Rates", Jan. 1, 2015; pp. 1-2, 629 (Year: 2015).

* cited by examiner

METHOD AND AN APPARATUS FOR COMPRESSION MOULDING AN OBJECT MADE OF POLYMERIC MATERIAL

The invention relates to a method and an apparatus for producing objects by compression moulding a polymeric material. The objects which can be produced by means of the method and the apparatus according to the invention may comprise, by way of example, caps for containers, preforms for obtaining containers by blow moulding or stretch-blow moulding, or containers. The polymeric material which may be processed by the method and the apparatus according to the invention can be any material suitable for use in compression moulding, in particular a semi-crystalline material such as polypropylene (PP), high density polyethylene (HDPE) or polyethylene terephthalate (PET). More broadly speaking, the method and the apparatus according to the invention can be used for processing any polymeric material having a melting temperature higher than its crystallization temperature and/or glass transition temperature.

Traditionally, the objects obtained by compression moulding semi-crystalline polymeric materials are produced by inserting into a mould a dose of polymeric material, the dose having a temperature higher than the respective melting temperature. The dose is shaped between a male element and a female element of the mould so as to obtain the desired object, which is then cooled inside the mould and then extracted therefrom.

EP 1265736, which belongs to the same patent family as WO 01/66327, discloses a method for producing an object by compression moulding a semi-crystalline polymeric material, wherein the polymeric material is heated inside of an extruder until the polymer material reaches a temperature higher than the melting temperature thereof. Subsequently, the polymeric material is cooled at a working temperature which is lower than the melting temperature, but higher than the crystallization start temperature at which crystallization begins during the cooling process. From the polymeric material so cooled, doses are obtained having a preset mass. The doses are inserted into respective moulds in which they are shaped between a male element and a female element. While the polymeric material is being shaped in the mould, temperature thereof is maintained at a value close to the crystallization start temperature. Subsequently, the object obtained by shaping the polymeric material, is cooled and then removed from the mould.

U.S. Pat. No. 4,874,571 discloses an apparatus for calendering a polymeric web coming out of an extruder, the polymeric web being made of a semi-crystalline polymeric material. The polymeric web is caused to pass between a first calendering roller and a second calendering roller. Thereafter, the polymeric material is wound around the second calendering roller which has a temperature of 180° C. or more. In the nip between the first calendering roller and the second calendering roller, there is provided a blowing device for emitting a cooled gas which helps the polymeric web to detach from the first calendering roller and to adhere to the second calendering roller. The flow rate of gas coming out of the blowing device is adjusted so as to attain an optimal transparency of the calendered web.

The blowing device is configured in such a manner that the polymeric web, for example in the case of polypropylene, does not cool below a temperature of 180° C., i.e. the polymeric web remains at a temperature higher than its melting temperature, which for polypropylene is about 165° C.

WO 87/04387 discloses a method for a solid-state stamping of a fiber-reinforced thermoplastic composite material. The composite material at issue comprises a matrix consisting of a semi-crystalline thermoplastic material. According to this method, the composite material is heated in an oven up to a temperature which is lower than its melting peak temperature. From the oven, the composite material is then transferred into a mould, thus allowing the thermoplastic material constituting the matrix to cool. Finally, the composite material is moulded into the mould at a temperature which, at the beginning of the moulding step, is lower than the melting peak temperature, but higher than the crystallization start temperature of the composite.

Documents U.S. Pat. No. 4,874,571 and WO 87/04387 do not provide any useful information for improving the known processes aimed at obtaining objects by compression moulding, since said documents refer to processes such as calendering and forming of composite materials having nothing in common with compression moulding of doses of polymeric material.

On the other hand, the method disclosed in EP 1265736 allows the cycle time to be reduced if compared with conventional methods in which the dose is introduced into the mould at a temperature higher than the melting temperature. Indeed, by introducing the dose of polymeric material into the mould at a working temperature which is lower than the melting temperature, but slightly higher than the start crystallization temperature, a reduction is obtained of the time which is required for cooling the moulded object from the working temperature to a temperature at which the moulded object can be extracted from the mould without being damaged.

However, the method disclosed in EP 1265736 can be further improved, particularly with regard to a further reduction of the time required to compression mould an object, i.e. of the cycle time, but also as regards obtainment of moulded objects exhibiting a rather high crystallinity degree and/or a relatively high molecular orientation and, consequently, good mechanical properties.

WO 2008/118643 discloses a process for producing a polymer article which is filled and oriented, wherein the polymer is die drawn for inducing polymer orientation and cavitation.

It is an object of the present invention to improve the methods and apparatuses for producing objects by compression moulding doses of polymeric material, particularly of semi-crystalline thermoplastic material. A further object is to speed up the production of objects made of polymeric material by compression moulding.

Another object is to increase the productivity of apparatuses for producing objects by compression moulding of doses of polymeric material.

Still a further object is to increase the crystallinity and/or the molecular orientations of a compression moulded object.

In a first aspect of the invention, there is provided a method for producing an object made of a polymeric material, said polymeric material having a melting temperature, the method comprising the steps of:
  melting the polymeric material;
  after the melting step, cooling the polymeric material below the melting temperature in a cooling zone;
  severing a dose from a flow of polymeric material coming from the cooling zone, by means of a severing element;
  obtaining said object by shaping the dose between a male forming element and a female forming element movable relative to one another, the dose having a temperature lower than said melting temperature, wherein the flow of polymeric material moves with an advancement speed along a path passing through the cooling zone and reaching the severing element, said advancement speed being calculated as an average value in a cross-section taken perpendicularly to an advancement direction of said flow, said advancement speed being greater than 1.5 mm/s along at least 70%, preferably 90%, of said path.

Owing to the first aspect of the invention, the productivity may be considerably increased compared to the methods of the prior art. In particular, the time required for producing an object made of a polymeric material by shaping it between the male forming element and the female forming element, is drastically reduced if compared with the methods of the known type.

Indeed, by positioning the dose in a mould between the male forming element and the female forming element at a temperature lower than the melting temperature, a reduction is obtained of the time which is required for cooling the formed object until a temperature is reached, at which said object can be handled and then extracted from the mould without being damaged. A reduction of the cycle time is thus obtained.

This time reduction increases, as the working temperature which can be adopted in the mould decreases, i.e. as there is a decrease in the temperature that the polymeric material can reach while being shaped between the male forming element and the female forming element. In particular, the temperature that the polymeric material has while being shaped between the male forming element and the female forming element, is maintained above the crystallization start temperature at which crystals begin to form within the polymeric material constituting the dose, in static conditions.

By adopting a high advancement speed upstream of the severing element, the molecular chains which are present in the polymeric material are brought into a condition of great agitation which makes it more difficult to freeze these chains in a crystallized condition. A decrease in the crystallization start temperature therefore occurs, so that the polymeric material may have relatively low temperatures while it is being shaped in the mould.

In addition, a quick advancement of the polymeric material causes a Flow Induced Crystallization to occur therein, that is to say, it causes acceleration of the kinetics of crystallization to occur, so that the moulded object can more quickly achieve a semi-crystalline state in which it exhibits a sufficient stiffness for being extracted from the mould without suffering any damages.

In fact, although the polymeric material is advanced quickly from the cooling zone toward the severing element, start-crystallization nuclei are formed within the flow of polymeric material. However, these nuclei are not capable of completing crystallization due to the high advancement speed. The high advancement speed ensures that such nuclei become aligned in an ordered manner, so that they can crystallize rapidly during moulding.

In other words, an increase in crystallinity and/or in molecular orientation of the moulded object occurs.

It was surprisingly found that a 10% reduction of the temperature that the dose has when it is introduced into the mould, leads to a 100% increase in productivity with respect to the prior art.

Further, in average, lower temperatures can also be maintained in the cooling zone and up to the severing element since, as already described, by increasing the advancement speed of the flow of polymeric material, the crystallization start temperature is decreased. This allows the polymeric material to be handled more easily, since it exhibits a higher viscosity and therefore a lower tackiness. It follows that the severing element can be simplified as well as the devices carrying the dose towards the mould and inserting the dose inside the mould.

It is also possible to work closer to the crystallization temperature, without incurring in a premature crystallization of the polymeric material.

In one embodiment, there is provided the step of accelerating the flow of polymeric material prior to severing the dose therefrom.

Thus, the speed of the flow of polymeric material can be further increased, which allows the working temperature inside the mould (i.e. the temperature which the dose has while being shaped between the male forming element and the female forming element) to be decreased even more significantly.

The flow of polymeric material can be accelerated downstream of the cooling zone.

In particular, the flow of polymeric material can be so accelerated as to have, when exiting a passage conduit arranged downstream of the cooling zone, an advancement speed about 10 times greater than the advancement speed which the flow of polymeric material had in the cooling zone.

This allows to obtain, near a wall delimiting the passage zone through which the flow of polymeric material passes downstream of the cooling zone, a minimum speed such that any crystals that are formed in the polymeric material do not adhere to the wall. The flow of polymeric material thus exerts a self-cleaning action on the walls with which it comes in contact downstream of the cooling zone.

In an embodiment, prior the step of severing a dose of polymeric material by means of the severing element, there is provided delivering the flow of polymeric material by means a nozzle in a position facing the severing element, so that the severing element can sever the dose from the flow.

Inside the nozzle, the flow of polymeric material can be accelerated in such a way as to reach an advancement speed which is 10 times greater, and preferably about 30 times greater, than the advancement speed the polymeric material had in the cooling zone.

This allows to achieve very high advancement speed of the flow of polymeric material, thus intensifying the phenomena and effects that have been described hereinabove.

In an embodiment, there is provided the step of moving the male forming element and the female forming element relative to one another so as to reach the following configurations in sequence:
- a start-of-forming configuration in which the dose is in contact with both the male forming element and the female forming element;
- a start-of-deceleration configuration in which the male forming element and the female forming element begin to decelerate relative to one another, and
- an end-of-forming configuration in which the dose has been shaped between the male forming element and the female forming element until the object is obtained, wherein, from the start-of-forming configuration to the start-of-deceleration configuration, the male forming element and the female forming element move relative to one another with an average mutual movement speed greater than 10 mm/s.

This ensures that a crystallization induced by the flow (Flow Induced Crystallization), occurs within the mould as well, thereby accelerating the crystallization kinetics and further reducing the time required for the moulded object to reach a semi-crystalline state, in which the moulded object is sufficiently rigid to be removed from the mould without suffering any damages.

In a second aspect of the invention, there is provided an apparatus for producing an object made of polymeric material, the apparatus comprising:
- a melting device for melting the polymeric material;
- a cooling zone for cooling below the melting temperature the polymeric material molten by the melting device;
- a severing element for severing a dose of polymeric material from a flow of polymeric material coming from the cooling zone;
- a mould for shaping the dose while the latter has a temperature lower than said melting temperature, wherein the severing element is positioned downstream of the cooling zone, so that a path is defined which passes through the cooling zone and reaches the severing element, and wherein said path is so dimensioned that the flow of polymeric material moves with an advancement speed greater than 1.5 mm/s along at least 70% of said path, preferably along at least 90% of said path, said advancement speed being calculated as an average value in a cross-section taken perpendicularly to an advancement direction of said flow.

The apparatus according to the second aspect of the invention allows to obtain the increase in productivity as well as the other advantages previously described with reference to the method according to the first aspect of the invention.

In a third aspect of the invention, there is provided an apparatus for producing an object made of polymeric material, the apparatus comprising:
- a melting device for melting the polymeric material;
- a cooling zone for cooling below the melting temperature the polymeric material molten by the melting device;
- a severing element for severing a dose of polymeric material from a flow of polymeric material coming from the cooling zone;
- a mould comprising a male forming element and an opposite element facing the male forming element, the opposite element and the male forming element being movable relative to one another for shaping the dose while the latter has a temperature lower than said melting temperature;
- a movement device for moving the male forming element and the opposite element one towards the other, so as to shape the dose between the male forming element and the opposite element until the object is obtained, wherein the movement device is so configured that, between a start-of-forming configuration, in which the dose starts to be shaped between the male forming element and a forming surface associated with the opposite element, and a start-of-deceleration configuration, in which the male forming element and the opposite element begin to decelerate relative to one another, the male forming element and the opposite element have a mutual movement speed greater than 10 mm/s.

Owing to the third aspect of the invention, a very high productivity is achievable.

First of all, a reduction in cycle time occurs since the polymeric material is introduced into the mould at a relatively low temperature, which allows to reach more quickly temperatures at which the moulded object can be extracted from the mould without being damaged, when the moulded object is cooled.

Furthermore, inside the mould a flow induced crystallization occurs which allows the kinetics of crystallization to be accelerated, thereby reducing the time needed for removing the object from the mould.

The cooling zone can be defined within a cooling device comprising for example a static mixer.

The static mixer is a type of heat exchanger which is particularly simple and effective, and which enables temperature and composition of the flow of polymeric material to be homogenized.

In one embodiment, the cooling zone is equipped with a conditioning system provided with at least one chamber in which a conditioning fluid circulates, the conditioning fluid being for example water, steam or diathermic oil.

This chamber may extend around a passage conduit provided in the cooling zone, particularly within the static mixer, for passage of polymeric material.

This allows rapid variations in the temperature of the flow of polymeric material which passes through the cooling zone.

In an embodiment, the apparatus comprises an accelerator device, particularly positioned downstream of the cooling zone, for accelerating the polymeric material directed towards the severing element.

The accelerator device can be thermally conditioned, particularly with diathermic oil, or steam, or water.

The apparatus may further comprise a nozzle arranged downstream of the cooling zone for delivering a flow of polymeric material in a position facing the severing element, so that the severing element can sever the doses from such flow.

In an embodiment, the nozzle can be thermally conditioned, particularly with diathermic oil, or water, or steam.

In this way an optimal control of the temperature of the polymeric material can be maintained also downstream of the cooling zone.

In a fourth aspect of the invention, there is provided a method for producing an object made of polymeric material, said polymeric material having a melting temperature, the method comprising the steps of:
- melting the polymeric material;
- after the melting step, cooling the polymeric material below the melting temperature in a cooling zone;
- severing a dose from a flow of polymeric material coming from the cooling zone by means of a severing element;
- obtaining said object by shaping the dose between a male forming element and a female forming element which move one towards the other with a mutual movement speed, the dose having a temperature lower than said melting temperature, wherein said mutual movement speed is greater than 10 mm/s between a start-of-forming configuration in which the dose is in contact with both the male forming element and the female forming element, and a start-of-deceleration configuration in which the male forming element and the female forming element begin to decelerate relative to one another.

This allows to obtain an increase in productivity, as previously described with reference to the apparatus according to the third aspect of the invention.

It was surprisingly found that, by adopting a mutual movement speed, as defined above, which is greater than 10 mm/s, defects on the produced object can be avoided, such as, for example, parts of the object that are incomplete or a whitening of the object.

Furthermore, the oxygen barrier properties of the finished object are improved.

In an embodiment, the produced object is made of polyethylene terephthalate (PET) and is particularly conformed as a preform for a container.

If the mutual movement speed is less than 10 mm/s, the preform may have incomplete parts, particularly in a threaded neck zone of the preform itself. A preform whitening, due to undesired crystallization phenomena, can further occur.

In an embodiment, the above mentioned mutual movement speed with which the male forming element and the female forming element move relatively to each other can be greater than 470 mm/s, particularly if the produced object is made of polypropylene (PP).

This object can be, particularly but not exclusively, conformed as a cup or a vial.

In an embodiment, the above mentioned mutual movement speed with which the male forming element and the female forming element move relatively to each other can be greater than 900 mm/s, particularly if the produced object is made of high density polyethylene (HDPE).

This object can be, particularly but not exclusively, conformed as a cap for a container.

Figure 1:
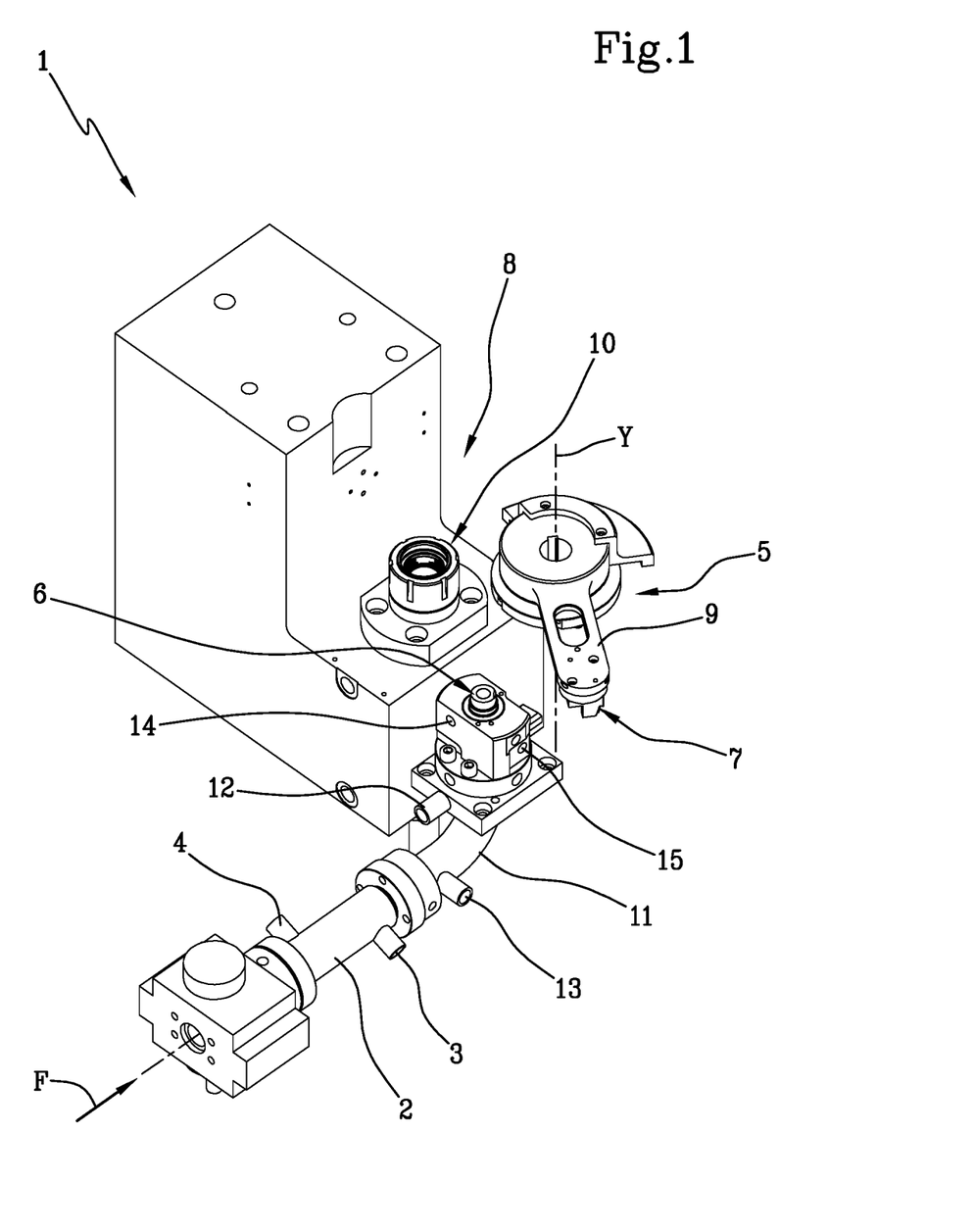
FIG. 1 is a partial schematic view of an apparatus for producing objects by compression moulding.

The invention will be better understood and carried out with reference to the appended drawings, which illustrate an embodiment thereof by way of non-limiting example, wherein:

FIG. 1 shows an apparatus 1 for producing an object by compression moulding a dose of polymeric material.

The object produced by means of the apparatus 1 may be a cap for a container, or a container, or a preform for obtaining a container by blow moulding or stretch-blow moulding, or more generally any concave or flat object.

The polymeric material used by the apparatus 1 can be any polymeric material that may be compression moulded, in particular a semi-crystalline material such as polypropylene (PP), high density polyethylene (HDPE), polyethylene terephthalate (PET).

Semi-crystalline materials are materials that exhibit, in their solid state, a fraction of crystalline mass and a fraction of amorphous mass.

For semi-crystalline polymeric materials, a melting temperature $T_F$ and a crystallization temperature $T_C$ may be defined.

In particular, the melting temperature $T_F$ is the temperature at which a polymeric material which is heated, passes from solid state to molten state.

The crystallization temperature $T_C$ is the temperature at which a fraction of material crystallizes during cooling. The crystallization temperature $T_C$ is lower than the melting temperature $T_F$.

To be more precise, the crystallization process does not occur at a specific temperature, but within a temperature range which is defined between a crystallization start temperature $T_{IC}$ and a crystallization end temperature $T_{FC}$.

Furthermore, the crystallization temperature $T_C$, as well as the difference existing between the crystallization start temperature $T_{IC}$ and the crystallization end temperature $T_{FC}$, are not constant for a given material, but depend on the conditions according to which the material is cooled. In particular, the lower is the temperature at which the molten polymeric material is maintained, the faster crystallization thereof takes place. Moreover, the more quickly the molten polymeric material is handled, the more the temperature range at which crystallization occurs lowers.

Figure 2:
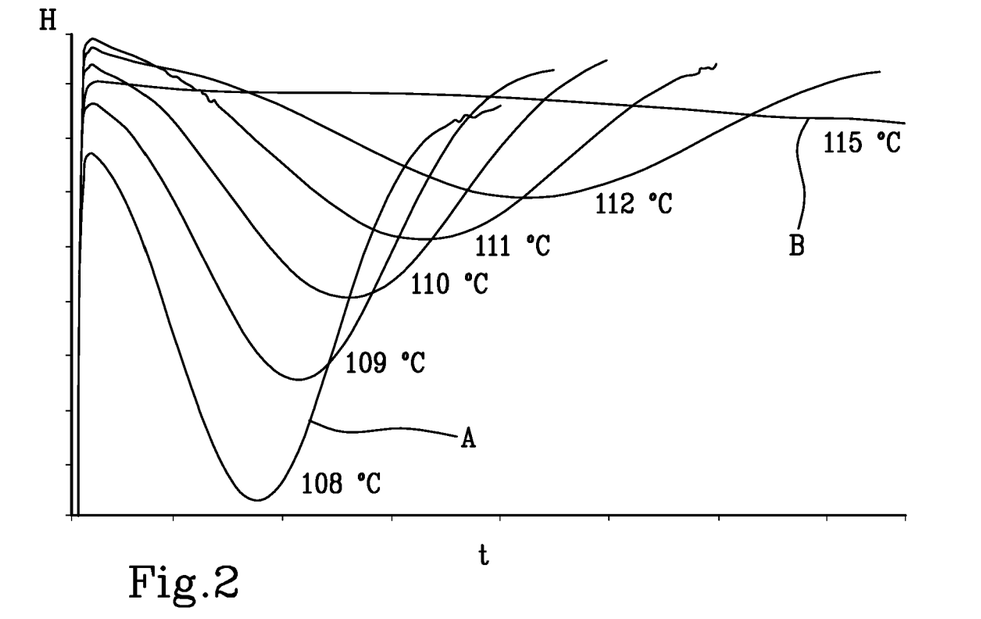
FIG. 2 is a graph showing how the crystallization of a particular type of polypropylene varies in function of the time.

This appears in FIG. 2, which shows the results of an analysis carried out by differential scanning calorimetry (DSC) on polypropylene samples. The material samples analyzed were brought to a temperature higher than the melting temperature, at which temperature they were kept for a few minutes so as to melt all the crystals present therein. The samples were then cooled down to a predetermined temperature and maintained at such temperature for the time necessary for each sample to be crystallized. Thus, crystallization times and modes were tested for each sample.

FIG. 2 shows the energy released from the samples analyzed as a function of time, during the crystallization step.

In particular, the curve indicated by A refers to the sample which was cooled to the lowest temperature, namely 108° C. In this sample, the crystallization has occurred in a shorter time and within a lower temperature range than the other samples analyzed. Curve A exhibits an exothermic crystallization peak which is the narrowest one among all the samples analyzed. This means that the difference between the crystallization start temperature $T_{IC}$ and the crystallization end temperature $T_{FC}$ for that sample, is minimum with respect to all other samples analyzed.

The curve referred to with B is instead relative to the sample which was cooled to the highest temperature, i.e. to a temperature of 115° C. In this sample the crystallization process did not occur, because the high temperature at which the sample was maintained did not allow crystals to be formed during the period of time in which the sample was observed.

This proves that the polymeric material crystallizes faster if a lower temperature is maintained.

A similar reasoning applies to the melting process and related melting temperature.

Figure 3:
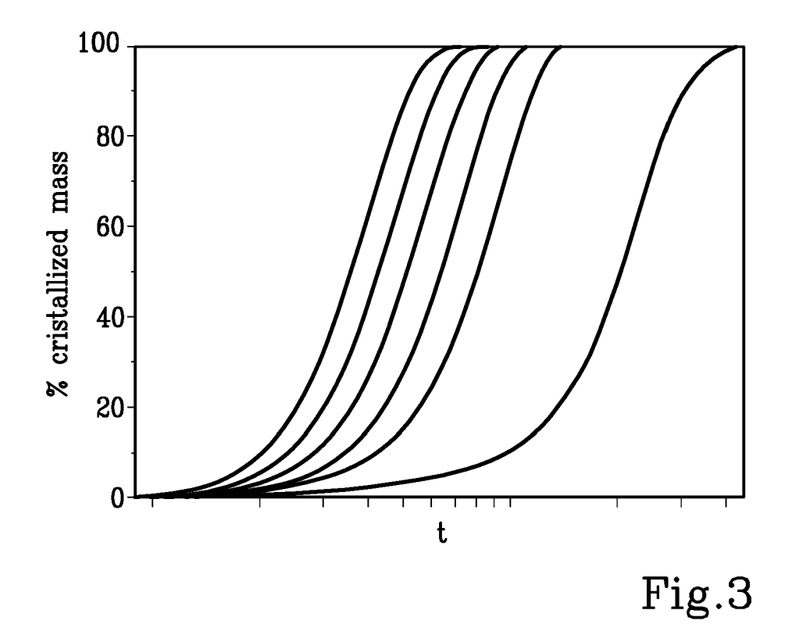
FIG. 3 is a graph showing how, with reference to the polypropylene of FIG. 2, the percentage of crystallized mass varies as a function of time.

FIG. 3, based on data obtained from FIG. 2, shows how the crystallized mass percentage varies in a sample as a function of time. Each curve refers to a different temperature up to which the sample was cooled, after which the sample temperature was kept constant. In particular, the temperature of each sample increases by moving from left to right in the graph. It is noted that, the lower is the temperature at which the sample is cooled, the more is reduced the time required for a 100% crystallization of the sample mass to occur.

Figure 4:
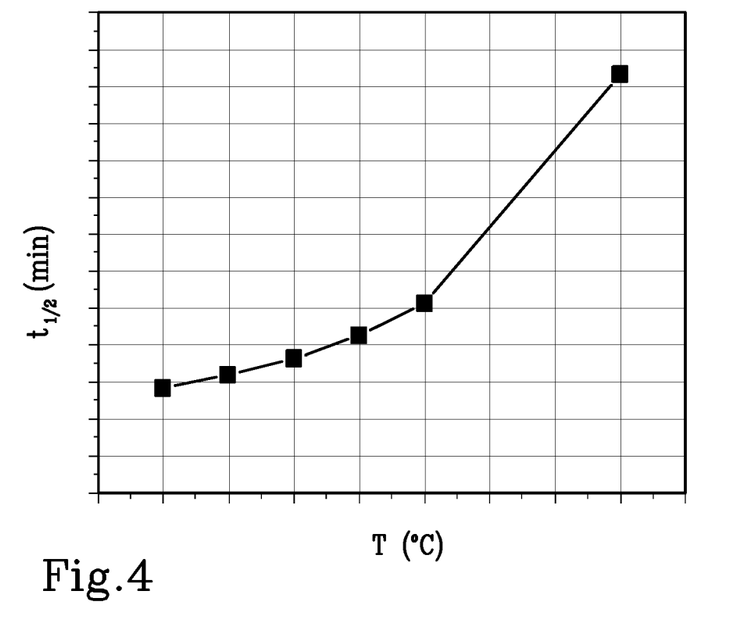
FIG. 4 is a graph showing how the time necessary for obtaining crystallization of 50% of the mass of the material varies depending on the temperature, with reference to the polypropylene of FIG. 2.

A half-crystallization time $t_{1/2}$ can be defined, which is the time needed by a sample to have half of the mass thereof crystallized. FIG. 4, based on data from FIGS. 2 and 3, shows the half-crystallization time $t_{1/2}$ as a function of temperature at which the sample was maintained. It is noted that, upon increasing of the temperature at which the sample was maintained, the half-crystallization time $t_{1/2}$ increases.

In summary, the behaviour of a semi-crystalline polymer during melting and crystallization thereof cannot be univocally determined, but is affected by the cooling conditions, following which the polymer is cooled. In particular, the lower is the temperature at which the molten polymer material is kept, the faster crystallization takes place.

The above considerations derive from studies concerning behavior of semi-crystalline polymeric materials which were carried out under static conditions, that is to say, while the sample analyzed was not undergoing any deformation. Crystallization occurring under these conditions is called quiescent crystallization.

Nevertheless, when a semi-crystalline polymeric material is subject to deformation, as it happens when the polymeric material is handled in a machine, for example for being subjected to compression moulding, a phenomenon occurs called Flow Induced Crystallization. While the material flows, anisotropic crystallites are formed which are oriented in the flow direction, and this modifies the crystallization kinetics of the material with respect to the condition under which the only quiescent crystallization occurs.

When a polymeric material is cooled below the melting temperature $T_F$ and at same time it is deformed, the quiescent crystallization and the flow induced crystallization combine, thus causing a globally faster crystallization of the material.

It was noted that, by displacing fast a molten polymeric material, the crystallization temperature thereof lowers and the temperature range within which crystallization takes place narrows. This is due to the fact that, by keeping the molten polymeric material in an agitated state, the polymeric chains of the polymeric material have less capability of organizing and solidifying in an ordered configuration.

The phenomena described hereinabove can be used to improve compression moulding of a semi-crystalline polymer, particularly in an apparatus 1 of the type shown in FIG. 1.

The apparatus 1 comprises a melting device not shown, in particular an extruder device, suitable for melting and extruding the polymeric material. The polymeric material is heated inside the extruder device, until the polymeric material reaches a temperature higher than the melting temperature $T_F$. Downstream of the extruder device, there is provided a cooling zone which, in the example shown, is defined inside a heat exchanger 2. The cooling zone is configured for cooling the flow of polymeric material coming from the extruder device at a temperature lower than the melting temperature $T_F$.

Figure 5:
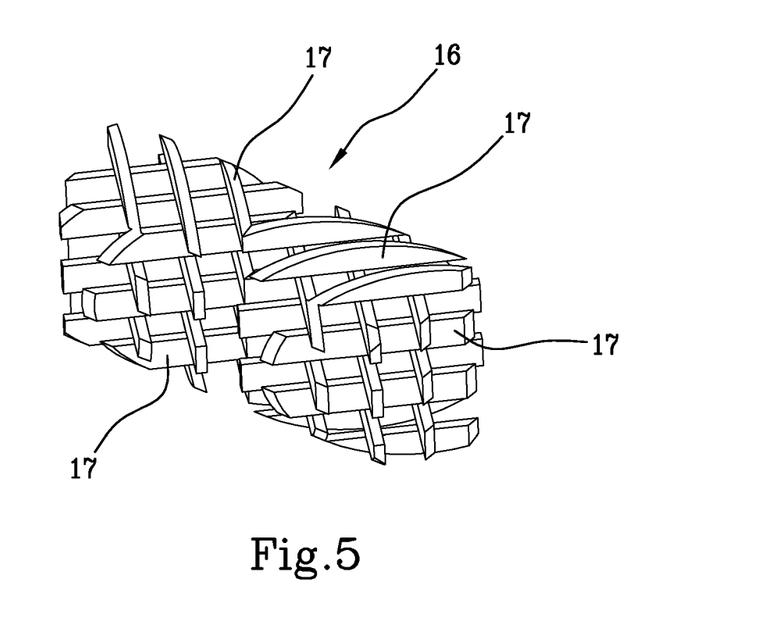
FIG. 5 is a perspective view showing a mixing element which can be positioned inside a static mixer.

The heat exchanger 2 may comprise a static mixer. The latter may comprise a conduit through which the polymeric material passes and within which a mixing element 16 of the type shown in FIG. 5 is arranged.

The mixing element 16 comprises a plurality of diverting bars 17 arranged in a stationary position for homogenizing the flow of polymeric material, both from the thermal viewpoint and, where appropriate, from the composition viewpoint. In particular, the diverting bars 17 may divide the main flow of polymeric material into a plurality of secondary flows which mix with one another along their path inside the static mixer.

The heat exchanger 2 is equipped with a conditioning system for controlling temperature of the flow of polymeric material downstream of the extruder device.

The conditioning system is in particular configured for maintaining the temperature of the polymeric material lower than the melting temperature $T_F$, but higher than the crystallization temperature $T_C$ under normal operating conditions. Of course, when the apparatus 1 starts to work, the conditioning system associated with the heat exchanger 2 as well as with the zones downstream of the heat exchanger 2, is controlled in such a way as to heat the polymeric material at a temperature higher than or equal to the melting temperature $T_F$. In this way the residual polymeric material left inside the apparatus 1, which solidified during the period of inactivity of the apparatus 1, can be once again melted and handled.

Subsequently, the conditioning system associated with the heat exchanger 2 as well as with the downstream parts of the latter, is controlled in such a manner as to bring temperature of the polymeric material to a value between the melting temperature $T_F$ and the crystallization temperature $T_C$, which will be kept during normal operation.

Diathermic oil can be used for the conditioning system as a conditioning means.

In particular, the diathermic oil can circulate inside a chamber surrounding the conduit through which the polymeric material flows when passing through the static mixer. The chamber can be provided with an inlet 3 through which the diathermic oil can enter into the chamber, and an outlet 4 through which the diathermic oil can exit the chamber. In particular, the outlet 4 can be arranged upstream of the inlet 3 relative to an advancement direction F, according to which the polymeric material advances inside the heat exchanger 2.

In this case, the heat exchanger 2 is therefore a countercurrent heat exchanger.

In order to avoid premature crystallization of the material, the heat exchanger 2 is configured for maintaining the flow of polymeric material passing through it at a temperature which is not excessively close to the crystallization temperature $T_C$ despite being sufficiently lower than the melting temperature $T_F$.

To this end, the diathermic oil passing through the heat exchanger 2 can have an average temperature $T_C$ as indicated below:

$$T_C - 30° C. \leq T_O \leq T_F - 30° C.$$

However this condition is not essential, and different temperatures of the diathermic oil can be satisfactorily used.

The apparatus 1 comprises a severing device 5 for severing metered quantities or doses of polymeric material from the flow of polymeric material coming from the heat exchanger 2.

In particular, the severing device 5 enables the doses to be severed from the flow of polymeric material exiting from a nozzle 6 arranged downstream of the heat exchanger 2. In the example shown, the nozzle 6 is facing upwards. In particular, the nozzle 6 can be so configured that the flow of polymeric material exiting from the nozzle 6 is directed along a vertical direction.

However other arrangements of the nozzle 6 are also possible.

The severing device 5 may comprise a collecting element 7, for example conformed as a concave element extending about a vertical axis, the collecting element 7 being suitable for passing close to the nozzle 6, particularly above the latter, so as to sever a dose of polymeric material therefrom. Thus the collecting element 7 acts as a severing element for severing the dose from the flow of polymeric material coming out of the nozzle 6. The dose remains attached to the collecting element 7, which carries the dose towards a mould 8 in which the dose can be shaped in order to obtain the desired object.

The collecting element 7 is rotatable about a rotation axis Y, particularly vertical. To this end, the collecting element 7 can be fastened to an end region of an arm 9 which is rotatable about the rotation axis Y.

The mould 8 may comprise a female element 10 and a male element which is not shown. In the example which is being described, the male element is arranged above the female element 10 in the, and aligned with the latter along a vertical axis. However, further mutual arrangements of the female member 10 and the male element are also possible.

FIG. 1 shows only one mould 8. However, the apparatus 1 may comprise a plurality of moulds 8, for example arranged in a peripheral region of a carousel. The carousel can be rotatable about a vertical axis.

The apparatus 1 comprises a movement device for moving the female element 10 and the male element one towards another and alternatively moving the female element 10 and the male element one away from another. In particular, the movement device is configured for moving the female element 10 and the male element with respect to one another between an open configuration, in which the female element 10 and the male element are spaced apart from one another, and an end-of-forming configuration, in which between the female element 10 and the male element a forming chamber is defined, the forming chamber having a shape corresponding to the object to be obtained.

Between the open configuration and the end-of-forming configuration, the female element 10 and the male element can assume further intermediate configurations as will be better described below.

The movement device can be associated to the female element 10 only, so as to move the female element 10 with respect to the male element which is instead maintained in a stationary position. Alternatively, the movement device can be associated to the male element, that is thus moved with respect to the female element 10, which instead is kept stationary.

Alternatively, the movement device can act simultaneously on both the male element and the female element 10, which are then both moved.

The movement device can be, for example, of the mechanical or hydraulic type. An example of a mechanical movement device is a cam device, whereas an example of a hydraulic movement device is a hydraulic actuator.

In any case, the movement device is configured for moving the male element and the female element 10 relative to one another along a moulding direction which in the example illustrated is vertical.

As mentioned above, the collecting element 7 is movable about the rotation axis Y. In particular, the collecting element 7 can be in a collecting position, in which the collecting element 7 is arranged above the nozzle 6 for removing a dose of polymeric material therefrom. Since the dose is in a state of a highly viscous fluid, the dose remains adherent to the collecting element 7 which, by rotating about the rotation axis Y, carries the dose towards the mould 8.

The collecting element 7 can furthermore be in a delivery position in which it is arranged above the female element 10 of the mould 8 so as to release the dose of polymeric material within a cavity of the female element 10, for example with the aid of pneumatic or mechanical means.

It is also possible to adopt collecting elements 7 having a different conformation from that shown in FIG. 1. By way of example, the severing device 5 could comprise a carousel supporting a plurality of collecting or severing elements suitable for interacting with the nozzle 6 in sequence, in order to sever respective doses from the nozzle 6.

In an alternative embodiment, which is not shown, the severing element for severing the dose may be supported by the mould 8.

It is also possible that the nozzle 6 extends to a rotating distributor which carries the molten polymeric material towards a mould, close to which the dose is severed from the flow of molten polymeric material, by means of a severing element.

The apparatus 1 may further comprise a passage conduit 11 interposed between the heat exchanger 2 and the nozzle 6. The passage conduit 11 may be "L"-shaped.

The passage conduit 11 can be thermally conditioned, so that the temperature of the polymeric material passing through the passage conduit 11 remains, inside the passage conduit 11, at a controlled value below the melting temperature $T_F$.

To this end, the passage conduit 11 may be provided with an outer chamber in which diathermic oil circulates. The outer chamber may be provided with an inlet opening 12 and an outlet opening 13.

The inlet opening 12 may be arranged downstream of the outlet opening 13 relative to the advancement direction F of the polymeric material in the apparatus 1. In this case, the diathermic oil circulates in a direction opposite to the polymeric material.

The temperature $T_C$ of the diathermic oil circulating in the passage conduit 11 can meet the condition previously indicated with reference to the heat exchanger 2, namely:

$$T_F - 30°\ C. \leq T_O \leq T_F - 30°\ C.$$

However this condition shall not be necessarily met. It is also possible to keep the diathermic oil circulating in the passage conduit 11 at a temperature slightly higher than that of the polymeric material passing through the passage conduit 11, in order not to cool the polymeric material excessively, especially if the polymeric material was already cooled in the heat exchanger 2.

Also the nozzle 6 can be thermally conditioned, in particular by means of diathermic oil circulating in an interspace arranged near an outer wall of the nozzle 6. This interspace can be provided with an inlet hole 14 and an outlet hole 15 respectively for the inlet and outlet of the diathermic oil.

Also in this case the diathermic oil circulating in the interspace associated to the nozzle 6 may have an average temperature $T_C$ which meets the following condition:

$$T_F - 30°\ C. \leq T_O \leq T_F - 30°\ C.$$

It may however also happen that the diathermic oil which thermally conditions the nozzle 6 has a higher temperature, in order not to cool excessively the polymeric material, particularly if the latter was already cooled inside the heat exchanger 2.

More broadly speaking, the diathermic oil which thermally conditions the heat exchanger 2, the diathermic oil which thermally conditions the passage conduit 11 and the diathermic oil which thermally conditions the nozzle 6, may have temperatures which differ from one another.

Conditioning fluids other than the diathermic oil, e.g. water, steam or other, can also be used.

The apparatus 1 may comprise an accelerator device for accelerating the flow of polymeric material coming from the extruder device. In the example illustrated, the nozzle 6 acts as an accelerator device, since it is provided with passage sections for the polymeric material, which passage sections decrease progressively in the advancement direction F, so as to accelerate the flow of polymeric material passing inside the nozzle 6.

Alternatively, or in combination with the above, also the passage conduit 11 can act as an accelerator device, provided that its internal sections are suitably dimensioned for accelerating the flow of polymeric material.

In an embodiment which is not shown, it is also possible to provide a different accelerator device, placed at any point between the heat exchanger 2 and the nozzle 6.

During operation, the polymeric material is extruded in the extruder device, in which the polymeric material is heated to a temperature higher than the melting temperature $T_F$ thereof.

The molten polymeric material passes from the extruder device into the heat exchanger 2, in which it is cooled to a temperature lower than the melting temperature $T_F$, but higher than the crystallization temperature $T_C$. Subsequently, the molten polymeric material passes through the passage conduit 11 and then through the nozzle 6, from which a flow of polymeric material exits. From this flow of polymeric material, a dose is severed by the severing device 5.

In the apparatus 1, a path for the flow of the polymeric material which was melted inside the extruder device may thus be defined. This path passes through the cooling zone and reaches the severing device 5. In particular, the path of the continuous flow of polymeric material starts in the cooling zone and ends as soon as the polymeric material interacts with the severing device 5.

In the example shown, the path mentioned above passes through the heat exchanger 2, inside which the cooling zone is defined, then passes through the passage conduit 11 and finally terminates at the outlet of the nozzle 6.

The passage cross-sections of the apparatus 1, as well as the pressure and the speed with which the polymeric material exits the extruder device, are such that the flow of polymeric material advances from the cooling zone towards the severing device 5 at an advancement speed greater than 1.5 mm/s.

In particular, the advancement speed of the flow of molten polymeric material is greater than 1.5 mm/s along the entire path which, starting from the beginning of the cooling zone, reaches the nozzle 6, or at least along a substantial part of said path, i.e. preferably along at least 90% of said path, or in any case along at least 70% of said path.

The advancement speed mentioned above is calculated as an average value of speed in any cross-section taken perpendicularly to the advancement direction F of the flow of polymeric material, said cross-section being interposed between the extruder device and the severing device 5.

Such average value can be calculated by dividing the flow rate of polymeric material by the respective passage section, and by determining the passage section on the basis of the internal diameter (or more generally of the internal dimensions) of the conduit through which the polymeric material passes For the sake of simplicity, any components located inside the conduit, such as extrusion screws or diverting bars 17 were neglected. In other words, for the purposes of calculating the passage section which will then be used for determining the average speed, it is assumed that the conduit through which the polymeric material passes is empty.

In the flow of polymeric material flowing along the path which passes through the cooling zone and reaches the nozzle 6, two undesired phenomena can occur, said undesired phenomena depending on the process conditions that are adopted.

A first undesired phenomenon is the solidification of parts of the polymeric material in contact with the walls of the components of the apparatus 1 in which the above mentioned path is defined, in particular in contact with the walls of the heat exchanger 2. This occurs when temperature of the conditioning fluid, for example diathermic oil, present inside the heat exchanger 2, is excessively lower than temperature of the polymeric material flowing through the heat exchanger 2. In this case, the polymeric material is excessively cooled inside the heat exchanger 2.

A second undesired phenomenon is bulk crystallization of the polymeric material, which occurs if temperature of the conditioning fluid in the heat exchanger 2 is not so low as to cause solidification of the polymeric material, but is however such as to excessively cool the polymeric material flowing in the heat exchanger 2.

Both these two phenomena depend on the advancement speed of the polymeric material, as well as on the temperature of the conditioning fluid, in particular diathermic oil, inside the heat exchanger 2.

In order that the heat exchanger 2 may efficiently remove heat from the flow of polymeric material, the temperature of the polymeric material does not have to be lower than the temperature of the conditioning fluid.

A situation in which the polymeric material is cooled in the heat exchanger 2 until a temperature equal to the temperature of the conditioning fluid is reached, is considered as an optimal working condition of the heat exchanger 2. In this situation, the extent of cooling applied by the heat exchanger 2 to the polymeric material is as great as possible.

It was experimentally found that the above mentioned optimal working condition of the heat exchanger 2 is reached when the polymeric material coming from the extruder device passes through the heat exchanger 2 with an advancement speed, as defined above, of 2.1 mm/s.

This value is optimal in order to obtain a heat exchanger 2 which is short and compact.

The advancement speed of the flow of polymeric material in the heat exchanger 2 is however greater than 1.5 mm/s, in order to avoid bulk crystallization phenomena or solidification of the polymeric material.

In the nozzle 6, and possibly also in the passage conduit 11, the flow of polymeric material is accelerated, thus acquiring an average speed greater than the average speed that it had in the heat exchanger 2.

In particular, in the passage conduit 11, the flow of polymeric material can be accelerated in such a way that, at the exit from the passage conduit 11, said flow has a speed 10 times greater than the speed that the flow of polymeric material had in heat exchanger 2.

In the nozzle 6 the flow of polymeric material can be accelerated even more significantly, so that the flow of polymeric material exits the nozzle 6 with a speed up to 30 times greater than its advancement speed in the heat exchanger 2.

The dose that was severed by the severing device 5 is carried by the collecting element 7, up to above a female element 10 of a mould 8.

The mould 8 is now arranged in the open configuration, in which the female element 10 is spaced apart from the male element.

The collecting element 7 can thus be interposed between the female element 10 and the male element and release the dose into the female element 10.

When the collecting element 7 is located above the female element 10, the dose is detached from the collecting element 7 and deposited into the cavity of the female element 10. The female element 10 and the male element move one towards another owing to the movement device, until they reach a start-of-forming configuration in which the dose of polymeric material is in contact with both the female element 10 and the male element and starts to be deformed between the female element 10 and the male element. At this stage, a forming step begins during which the shape of the polymeric material is gradually modified until the shape of the desired finished object is obtained.

The female element 10 and male element are moved one towards another until an end-of-forming configuration is reached, in which the forming chamber defined between the male element and the female element 10 has a shape corresponding to the shape of the object which is to be obtained. At this point, the female element 10 and male element are maintained in the mutual position that has been reached in order to enable the object to crystallize and to become enough resistant for being extracted from the mould 8 without being damaged.

Shortly before the end-of-forming configuration is reached, a start-of-deceleration configuration can be reached, in which the mutual speed with which the female element 10 and the male element move towards one another begins to decrease. This is due to the resistance exhibited by the polymeric material against being compressed between the female element 10 and the male element.

Between the start-of-forming configuration and the start-of-deceleration configuration, the movement device moves the female element 10 and the male element one towards another with a mutual movement speed greater than 10 mm/s.

In particular, this speed can be greater than 30 mm/s.

This speed can further be less than 800 mm/s.

During some tests, even advancement speeds of 4000 mm/s were successfully reached. Hence, moulding at least up to this latter value of mutual movement speed seems successfully possible.

At the end of forming, the mould 8 is opened and the male element and female element 10 are moved away from each other. The formed object is then removed from the mould 8 and a new forming cycle can start.

The dose is inserted into the mould at a temperature $T_{LAV}$ which is lower than the melting temperature $T_F$ of the polymeric material of the dose, but higher than the crystallization start temperature $T_{IC}$ at which crystals would begin forming, in static conditions.

While the polymeric material that constitutes the dose is being shaped between the female element 10 and the male element of the mould, temperature thereof is maintained above the crystallization start temperature $T_{IC}$.

This does not mean that also the temperature of the female element 10 and male element of the mould is lower than the crystallization start temperature $T_{IC}$. The female element 10 and the male element of the mould can be provided with respective cooling circuits inside each of which a cooling fluid circulates. Although the temperature of the polymeric material that is being shaped is lower than the crystallization start temperature $T_{IC}$, the temperature of the cooling fluid, as well as that of the respective mould elements, can be lower, even significantly, than the crystallization start temperature $T_{IC}$.

When the mould 8 has reached the end-of-forming configuration in which the compression moulded object has reached its substantially definitive shape, the object is cooled below the crystallization temperature $T_C$ thereof. The cooling of the object can occur with a cooling rate greater than 3.5° C./s, so that solidification takes place as quickly as possible.

When producing bottle caps according to the method and the apparatus described above, it was surprisingly possible to obtain a 50% reduction in cycle time compared to the known methods.

It is believed that this result is attributable to the synergistic combination of two distinct phenomena.

On the one hand, inserting the dose into the mould 8 at a temperature lower than the melting temperature $T_F$ allows to reduce the time required to cool the compression moulded object down to a temperature at which the moulded object can be extracted from the mould and handled without being significantly deformed.

On the other hand, by subjecting the flow of polymeric material to a high speed upstream of the mould 8 and/or inside of the latter, an increase of the shear rate of the polymeric material, and thus an acceleration of the kinetics of crystallization is attained, because the flow induced crystallization is added to the quiescent crystallization which would occur under static conditions.

In particular, inside the mould 8, the polymeric material flowing in the relatively narrow spaces defined between the female element 10 and the male element, is subjected to a high shear rate, which causes the formation of oriented and aligned crystallization nuclei, on which the crystals grow.

The two effects described above combine with each other thereby leading to a result which goes beyond the algebraic sum that each of them would have if taken alone.

The flow induced crystallization is particularly evident for the materials having a high molecular weight, such as those that are usually used for compression moulding. Such materials typically have values of atomic mass greater than 10.000 Daltons.

The flow induced crystallization is instead less significant for materials having a low molecular weight, in which a positive effect can still be obtained by subjecting the material to high shear rates, since this allows the material to be cooled more quickly and therefore the crystallization temperature $T_C$ to be decreased.

For the reasons set forth above, it is useful to accelerate the polymeric material prior to introducing the dose into the mould 8.

The conditioning system associated with the heat exchanger 2 and, possibly, also with the passage conduit 11 and/or the nozzle 6, allows temperature of the flow of polymeric material coming from the extruder device to be accurately controlled, thus helping to prevent an excessive crystallization outside the mould 8.

Some tests were carried out in order to determine how the mutual movement speed, with which the female element 10 moves relative to the male element, affects the properties of the formed object.

A first series of tests concerned preforms for container made of polyethylene terephthalate (PET). These preforms comprised a hollow body, having a first end that was closed. At a second end of the preform, opposite the first end, a threaded neck was provided, the threaded neck being intended to form a neck of a container.

Initially, preforms having a thickness of the hollow body of 4 mm were produced. This thickness corresponds to a maximum value of preform thickness that can currently be found on the market.

It was experimentally found that, if the female element 10 and the male element are moved relative to one another (between the start-of-forming configuration and the start-of-deceleration configuration) with a mutual movement speed of less than 10 mm/s, defects tend to be originated on the preforms. These defects may consist in a preform whitening, as well as in the generation of preform zones in which no polymeric material is present, particularly at the threaded neck. In other words, some parts of the preform were formed incompletely (incompleteness defects), since the molten polymeric material was not capable of filling the whole forming chamber defined between the female element 10 and the male element.

If, on the other hand, the mutual movement speed, as defined above, is greater than 10 mm/s, the preforms did not exhibit whitening or incompleteness defects.

Subsequently, preforms were produced having a thickness of the hollow body of 2.5 mm, which corresponds to one of the lowest values currently available on the market.

In this case, the whitening and incompleteness defects did not occur when the female element 10 and the male element were moved relative to one another (between the start-of-forming configuration and the start-of-deceleration configuration) with a mutual movement speed of greater than 18 mm/s. Below this value, the preforms were incomplete or exhibited white zones.

A second series of tests concerned production of cups or vials, i.e. containers having a hollow body with a substantially cylindrical or frustum-conical shape, made of polypropylene (PP).

It was found that, by moving the female element 10 and the male element relative to one another (between the start-of-forming configuration and the start-of-deceleration configuration) with a mutual movement speed of less than 470 mm/s, the upper part of the object, arranged near a corresponding free edge, was incomplete. In other words, the free edge—instead of being shaped as a substantially flat circumference—had a valley in which the polymeric material was absent.

If, on the other hand, the mutual movement speed, as defined above, was greater than 470 mm/s, the cups produced during the tests did not exhibit incompleteness defects.

A third series of tests concerned production of caps for containers, the caps being in particular of the kind provided with an inner thread, made of high density polyethylene (HDPE).

In this case, it was found that, when moving the female element 10 and the male element relative to each other (between the start-of-forming configuration and the start-of-deceleration configuration) with a mutual movement speed of less than 900 mm/s, a significant percentage of incomplete caps were produced. In particular, if the mutual movement speed mentioned above was 460 mm/s, 18% of the produced caps had incompleteness defects.

If, on the other hand, the mutual movement speed, as defined above, was greater than 900 mm/s, all the formed caps were free of incompleteness defects.

In the example mentioned above, it was in addition found that the caps produced by using mutual movement speeds greater than 900 mm/s had oxygen barrier properties increased by 15% if compared with caps produced by using a mutual movement speed of 460 mm/s.

The experimental results prompt to believe that the improvement in oxygen barrier properties occurs even for objects different from caps and materials different from high density polyethylene.

Furthermore, the increase in the above mentioned mutual movement speed allowed a reduction in the moulding pressure, i.e. in the pressure with which the female element 10 and the male element were pushed one against another, with consequent decreased stress on the components of the apparatus 1.

The results of the tests referred to above show that, although the value of mutual movement speed below which defects occur depends on several factors, such as geometry and material of the moulded object, the incompleteness and/or whiteness defects are practically certain if mutual movement speeds of less than 10 mm/s are used.

In the above description, reference was made to a cooling zone defined inside a heat exchanger 2 comprising a static mixer.

This condition is however not essential.

Indeed it may happen that the cooling zone is defined inside a dynamic mixer, i.e. a mixer provided with mixing elements which move during operation, rather than inside a static mixer.

Again, the cooling zone can be defined inside a cascade extruder or a satellite extruder, particularly located immediately downstream of the extruder device which melts and extrudes the polymeric material.

The cooling zone could also be defined inside a twin screw extruder suitably conditioned.

Theoretically, the cooling zone could be defined inside the same melting device which melts the polymeric material, which melting device could be provided with an end part configured to cool the molten polymeric material. In broad terms, the whole length of the apparatus 1 interposed between the melting device or extruder device and the severing device 5 can be thermally conditioned so as to cool the polymeric material. In such a case, the cooling zone begins immediately downstream of the point where the polymeric material is melted and continues up to the nozzle 6. Alternatively, the cooling zone may only affect a portion of the apparatus 1 arranged downstream of the point where the polymeric material is melted. In this case, the cooling zone ends upstream of the nozzle 6 and between the cooling zone and the nozzle 6, a maintenance zone is interposed, in which the temperature of the polymeric material is maintained at desired values.

In this case, the temperature of the polymeric material in the maintenance zone arranged downstream of the cooling zone may be comprised, or substantially comprised, between the crystallization temperature $T_C$ and the melting temperature $T_F$. By the term "substantially comprised" it is meant that at least 90% of the polymeric material has a temperature in the range between the crystallization temperature $T_C$ and the melting temperature $T_F$. However small polymeric material portions may exist which have a temperature higher than the melting temperature $T_F$, particularly close to the surface of the polymeric material flowing in contact with the walls of the apparatus 1.

Additionally, the accelerator device shall not necessarily be present.

Even if the accelerator device is present, the flow of polymeric material can decelerate before the dose is severed by the severing device 5.

In the example shown, reference was made to a situation in which the dose is shaped between a female forming element and a male forming element belonging to the mould, i.e. the female element 10 and the male element which is not shown.

It can further happen that the dose is shaped in contact with an object which is not integrated in the mould, although it behaves like a moulding element while the dose is being formed. This is what happens, for example, in the case of the so called lining, in which the dose is shaped so as to form a liner inside a previously formed cap. More generally, the dose may be moulded inside the cavity of an object, so as to form a component anchored to the object.

In this case, the cap or, more broadly, the object provided with a cavity inside which the dose is shaped, acts as a female forming element, whereas the male forming element is integrated in the mould. In addition to the male forming element, the mould also comprises in this example a support element facing the male forming element and suitable for supporting the object inside which the dose has to be shaped during moulding.

In broad terms, it can therefore be stated that the mould comprises a male forming element and an opposite element facing the male forming element. The opposite element may be a female forming element or, alternatively, a support element for supporting an object inside which the dose is shaped.

What was previously described with reference to the embodiment in which the female forming element is a part of the mould, is to be understood also as referring to an embodiment in which the dose is shaped inside of an object which is not integrated in the apparatus 1 and which acts as a female forming element.

The invention claimed is:

1. A method for producing an object made of polymeric material, said polymeric material being a semi-crystalline material and having a melting temperature and a crystallization temperature, the method comprising the steps of:
melting the polymeric material;
after the step of melting, cooling the polymeric material below the melting temperature in a cooling zone;
using a severing element, severing a dose from a continuous flow of polymeric material coming from the cooling zone and exiting from a nozzle;
obtaining said object by shaping the dose in a mould between a male forming element and a female forming element which move towards one another with a mutual movement speed, the dose having a temperature lower than said melting temperature,
wherein the flow of polymeric material moves with an advancement speed along a path starting at the cooling zone and reaching the severing element, the method further comprising the step of accelerating the flow of polymeric material outside the mould prior to severing the dose therefrom, the flow of polymeric material being accelerated downstream of the cooling zone so as to have an advancement speed greater than the advancement speed the polymeric material had in the cooling zone, whereby an accelerated flow of polymeric materials exits from the nozzle along a direction and the dose is severed from the accelerated flow and released into the mould while the mould is arranged in an open configuration, wherein the step of accelerating the flow of polymeric material is carried out while the polymeric material is at a temperature comprised between the melting temperature and the crystallization temperature.

2. A method according to claim 1, wherein the flow of polymeric material is so accelerated as to have, at the exit of a passage conduit arranged downstream of the cooling zone, an advancement speed greater than 10 times than the advancement speed that the flow of polymeric material had in the cooling zone.

3. A method according to claim 1, wherein the flow of polymeric material is dispensed by the nozzle in a position facing the severing element, so that the severing element can sever the dose from the flow of polymeric material exiting from the nozzle.

4. A method according to claim 3, wherein, inside the nozzle, the flow of polymeric material is so accelerated as to have an advancement speed greater than 10 times the advancement speed the polymeric material had in the cooling zone.

5. A method according to claim 4, wherein, inside the nozzle, the flow of polymeric material is so accelerated as to have an advancement speed equal to 30 times the advancement speed the polymeric material had in the cooling zone.

6. A method according to claim 1, wherein the step of cooling the polymeric material comprises using a conditioning fluid for removing heat from the polymeric material.

7. A method according to claim 6, wherein the conditioning fluid is selected from between: water, steam, diathermic oil.

8. A method according to claim 1, and further comprising the step of thermally conditioning the polymeric material downstream of the cooling zone and upstream of the severing element, in order to maintain temperature of the polymeric material comprised between the melting temperature and a crystallization start temperature at which the polymeric material begins crystallizing under static conditions.

9. A method according to claim 1, wherein the dose of polymeric material is deformed between the male forming element and the female forming element while said dose has a temperature higher than a crystallization start temperature at which the polymeric material begins crystallizing under static conditions.

10. A method according to claim 1, wherein the direction along which the accelerated flow of polymeric material exits from the nozzle is a vertical direction.

11. A method according to claim 1, wherein the flow of polymeric material is accelerated upstream of the nozzle.

* * * * *